US012602392B2

(12) United States Patent
Renick

(10) Patent No.: US 12,602,392 B2
(45) Date of Patent: Apr. 14, 2026

(54) SCALABLE METADATA-DRIVEN DATA INGESTION PIPELINE

(71) Applicant: Insight Direct USA, Inc., Tempe, AZ (US)

(72) Inventor: Dirk Renick, Albany, CA (US)

(73) Assignee: Insight Direct USA, Inc., Chandler, AZ (US)

( * ) Notice: Subject to any disclaimer, the term of this patent is extended or adjusted under 35 U.S.C. 154(b) by 283 days.

(21) Appl. No.: 17/670,896

(22) Filed: Feb. 14, 2022

(65) Prior Publication Data

US 2023/0259518 A1     Aug. 17, 2023

(51) Int. Cl.
| | |
|---|---|
| *G06F 16/25* | (2019.01) |
| *G06F 16/23* | (2019.01) |
| *G06F 21/60* | (2013.01) |
| *G06F 21/62* | (2013.01) |

(52) U.S. Cl.
CPC ........ *G06F 16/254* (2019.01); *G06F 16/2358* (2019.01); *G06F 16/258* (2019.01); *G06F 21/604* (2013.01); *G06F 21/6218* (2013.01)

(58) Field of Classification Search
CPC .. G06F 16/254; G06F 16/258; G06F 16/2358; G06F 21/604; G06F 21/6218
See application file for complete search history.

(56) References Cited

U.S. PATENT DOCUMENTS

| | | |
|---|---|---|
| 6,161,103 A | 12/2000 | Rauer et al. |
| 6,189,004 B1 | 2/2001 | Rassen et al. |
| 6,212,524 B1 | 4/2001 | Weissman et al. |
| 7,461,076 B1 | 12/2008 | Weissman et al. |
| 7,475,080 B2 | 1/2009 | Chowdhary et al. |
| 7,681,185 B2 | 3/2010 | Kapoor et al. |
| 7,720,804 B2 | 5/2010 | Fazal et al. |

(Continued)

FOREIGN PATENT DOCUMENTS

| | | |
|---|---|---|
| AU | 2017224831 A1 | 8/2018 |
| CA | 2795757 A1 | 5/2013 |

(Continued)

OTHER PUBLICATIONS

International Search and Written Opinion for International Application No. PCT/US2023/016919, dated Sep. 1, 2023, 19 pages.

(Continued)

*Primary Examiner* — Charles D Adams
(74) *Attorney, Agent, or Firm* — Kinney & Lange, P.A.

(57)     ABSTRACT

A method of ingesting data into a data lake includes initiating a data pipeline by performing a lookup activity that includes querying a data structure to retrieve metadata corresponding to data sources, and performing a sequence of activities for each of the data sources. The metadata stored in the data structure includes information that enables identifying and connecting to each of the data sources. The sequence of activities includes connecting to a respective one of the data sources using a portion of the metadata that corresponds to the respective one of the data sources; accessing, from the respective one of the data sources, a data object specified by the portion of the metadata that corresponds to the respective one of the data sources; and storing the data object in the data lake, the data lake being remote from each of the data sources.

27 Claims, 8 Drawing Sheets

(56) References Cited

U.S. PATENT DOCUMENTS

| | | | |
|---|---|---|---|
| 7,739,224 B1 | 6/2010 | Weissman et al. | |
| 7,747,563 B2 | 6/2010 | Gehring | |
| 7,792,921 B2 | 9/2010 | Taylor et al. | |
| 7,844,570 B2 | 11/2010 | Netz et al. | |
| 8,086,583 B2 | 12/2011 | Crutchfield et al. | |
| 8,311,975 B1 | 11/2012 | Gonsalves | |
| 8,315,972 B2 | 11/2012 | Chkodrov et al. | |
| 9,466,037 B2 | 10/2016 | Reed et al. | |
| 9,477,451 B1 | 10/2016 | O'Farrell | |
| 9,727,591 B1 | 8/2017 | Sharma et al. | |
| 9,727,604 B2 | 8/2017 | Jin et al. | |
| 9,740,992 B2 | 8/2017 | Fazal et al. | |
| 10,025,622 B2 | 7/2018 | Rijhsinghani et al. | |
| 10,095,766 B2 | 10/2018 | Kapoor et al. | |
| 10,122,783 B2 | 11/2018 | Qiao et al. | |
| 10,360,239 B2 | 7/2019 | Kapoor et al. | |
| 10,469,585 B2 | 11/2019 | Zhao et al. | |
| 10,599,678 B2 | 3/2020 | Kapoor et al. | |
| 10,642,854 B2 | 5/2020 | Pattnaik et al. | |
| 10,719,480 B1 | 7/2020 | Todd | |
| 10,853,338 B2 | 12/2020 | Meacham et al. | |
| 10,860,599 B2 | 12/2020 | Mccluskey et al. | |
| 10,885,051 B1 | 1/2021 | Peters et al. | |
| 10,997,243 B1 | 5/2021 | Paulus et al. | |
| 11,030,166 B2 | 6/2021 | Swamy et al. | |
| 11,113,294 B1 | 9/2021 | Bourbie et al. | |
| 11,119,980 B2 | 9/2021 | Szczepanik et al. | |
| 11,137,987 B2 | 10/2021 | Namarvar et al. | |
| 11,269,913 B1* | 3/2022 | Dervay | G06F 16/254 |
| 11,487,777 B1* | 11/2022 | Bose | G06F 16/2455 |
| 2006/0080156 A1 | 4/2006 | Baughn et al. | |
| 2006/0253830 A1 | 11/2006 | Rajanala et al. | |
| 2007/0203933 A1 | 8/2007 | Iversen et al. | |
| 2007/0282889 A1 | 12/2007 | Ruan et al. | |
| 2008/0046803 A1* | 2/2008 | Beauchamp | G06F 16/957 |
| | | | 715/212 |
| 2008/0183744 A1 | 7/2008 | Adendorff et al. | |
| 2008/0288448 A1 | 11/2008 | Agredano et al. | |
| 2009/0055439 A1 | 2/2009 | Pai et al. | |
| 2009/0265335 A1 | 10/2009 | Hoffman et al. | |
| 2009/0281985 A1 | 11/2009 | Aggarwal | |
| 2010/0106747 A1 | 4/2010 | Honzal et al. | |
| 2010/0122258 A1 | 5/2010 | Reed et al. | |
| 2010/0211539 A1 | 8/2010 | Ho | |
| 2011/0029478 A1 | 2/2011 | Broeker | |
| 2011/0113005 A1 | 5/2011 | He et al. | |
| 2011/0264618 A1 | 10/2011 | Potdar et al. | |
| 2012/0005151 A1 | 1/2012 | Vasudevan et al. | |
| 2012/0173478 A1 | 7/2012 | Jensen et al. | |
| 2012/0254103 A1 | 10/2012 | Cottle et al. | |
| 2013/0275365 A1 | 10/2013 | Wang et al. | |
| 2014/0095249 A1 | 4/2014 | Tarakad et al. | |
| 2014/0244573 A1 | 8/2014 | Gonsalves | |
| 2014/0304217 A1 | 10/2014 | Nowakowski et al. | |
| 2015/0169602 A1 | 6/2015 | Shankar et al. | |
| 2015/0317350 A1 | 11/2015 | Roy-Faderman | |
| 2016/0147850 A1 | 5/2016 | Winkler et al. | |
| 2016/0241579 A1 | 8/2016 | Roosenraad et al. | |
| 2017/0011087 A1 | 1/2017 | Hyde et al. | |
| 2017/0116305 A1 | 4/2017 | Kapoor et al. | |
| 2017/0116306 A1 | 4/2017 | Kapoor et al. | |
| 2017/0116307 A1 | 4/2017 | Kapoor et al. | |
| 2017/0132357 A1* | 5/2017 | Brewerton | G16B 50/00 |
| 2017/0286255 A1 | 10/2017 | Kinnear et al. | |
| 2018/0025035 A1 | 1/2018 | Xia et al. | |
| 2018/0081641 A1 | 3/2018 | Ron et al. | |
| 2018/0095952 A1 | 4/2018 | Rehal | |
| 2018/0246944 A1 | 8/2018 | Yelisetti et al. | |
| 2018/0357237 A1 | 12/2018 | Balasubrahmanian et al. | |
| 2019/0138319 A1 | 5/2019 | Haupt et al. | |
| 2019/0243836 A1 | 8/2019 | Nanda et al. | |
| 2019/0332495 A1 | 10/2019 | Fair et al. | |
| 2019/0340103 A1 | 11/2019 | Nelson et al. | |
| 2020/0019558 A1* | 1/2020 | Okorafor | G06F 21/6254 |
| 2020/0067789 A1 | 2/2020 | Khuti et al. | |
| 2020/0097851 A1 | 3/2020 | Alvarez et al. | |
| 2020/0151198 A1 | 5/2020 | Wang | |
| 2020/0379985 A1 | 12/2020 | Athavale et al. | |
| 2021/0056084 A1* | 2/2021 | Guha | G06F 16/213 |
| 2021/0081848 A1 | 3/2021 | Polleri et al. | |
| 2021/0117437 A1 | 4/2021 | Gibson | |
| 2021/0133189 A1* | 5/2021 | Prado | G06F 16/2465 |
| 2021/0135772 A1 | 5/2021 | Brown et al. | |
| 2021/0173846 A1 | 6/2021 | Verma et al. | |
| 2021/0232603 A1 | 7/2021 | Sundaram et al. | |
| 2021/0232604 A1 | 7/2021 | Sundaram et al. | |
| 2021/0271568 A1 | 9/2021 | Abdul Rasheed et al. | |
| 2021/0326717 A1 | 10/2021 | Mueller et al. | |
| 2021/0351979 A1 | 11/2021 | Delay et al. | |
| 2022/0171738 A1 | 6/2022 | Lee et al. | |
| 2022/0207418 A1 | 6/2022 | Cardoso et al. | |
| 2022/0239759 A1 | 7/2022 | Grey et al. | |
| 2022/0309324 A1 | 9/2022 | Nama et al. | |
| 2022/0350674 A1 | 11/2022 | Velasco | |
| 2023/0015688 A1 | 1/2023 | Durakovic et al. | |
| 2023/0082010 A1 | 3/2023 | Clifford et al. | |
| 2023/0168895 A1 | 6/2023 | Shah et al. | |
| 2023/0236835 A1 | 7/2023 | Österlund et al. | |

FOREIGN PATENT DOCUMENTS

| | | | |
|---|---|---|---|
| CN | 112597218 A | 4/2021 | |
| CN | 112883091 A | 6/2021 | |
| EP | 2079020 A1 | 7/2009 | |
| IN | 2606MUM2009 A | 2/2012 | |
| IN | 201914044380 A | 11/2019 | |
| WO | 2020092291 A1 | 5/2020 | |

OTHER PUBLICATIONS

Dominik Jens Elias Waibel et al.: "InstantDL: an easy-to-use deep learning pipeline for image segmentation and classification," BMC Bioinformatics, Biomed Central LTD, London, UK, vol. 22, No. 1, Mar. 2, 2021 (Mar. 2, 2021).

International Search Report and Written Opinion for International Application No. PCT/US2023/016922, dated Jun. 28, 2023, 10 pages.

International Search Report and Written Opinion for International Application No. PCT/US2023/016925, dated Sep. 20, 2023, 9 pages.

Partial International Search and Provisional Opinion for International Application No. PCT/US2023/016919, dated Jul. 11, 2023, 14 pages.

International Search Report and Written Opinion for International Application No. PCT/US2023/016915, dated Jul. 4, 2023, 14 pages.

Xu Ye: "Data Migration from on-premise relational Data Warehouse to Azure using Azure Data Factory," Oct. 2018 (Oct. 2018), XP093057148 retrieved Jun. 23, 2023.

Yan Zhao et al: "Data Lake Ingestion Management," arxiv.org, Cornell University Library, 201 Olin Library Cornell University Ithaca, NY 14856, Jul. 5, 2021 (Jul. 5, 2021), XP091008365, section 2.

Malhotra Gaurav: "Get started quickly using templates in Azure Data Factory," Feb. 11, 2019 (Feb. 11, 2019), XP093057259, retrieved Jun. 23, 2023.

Anonymous: "Slowly changing dimension," Feb. 6, 2022 (Feb. 6, 2022), XP093057274, retrieved Jun. 23, 2023.

Masino et al. "A SCALA DSL for Rapid ETL Configuration and Execution," The Third Annual Scala Workshop, 2012, pp. 1-12 (Year: 2012).

* cited by examiner

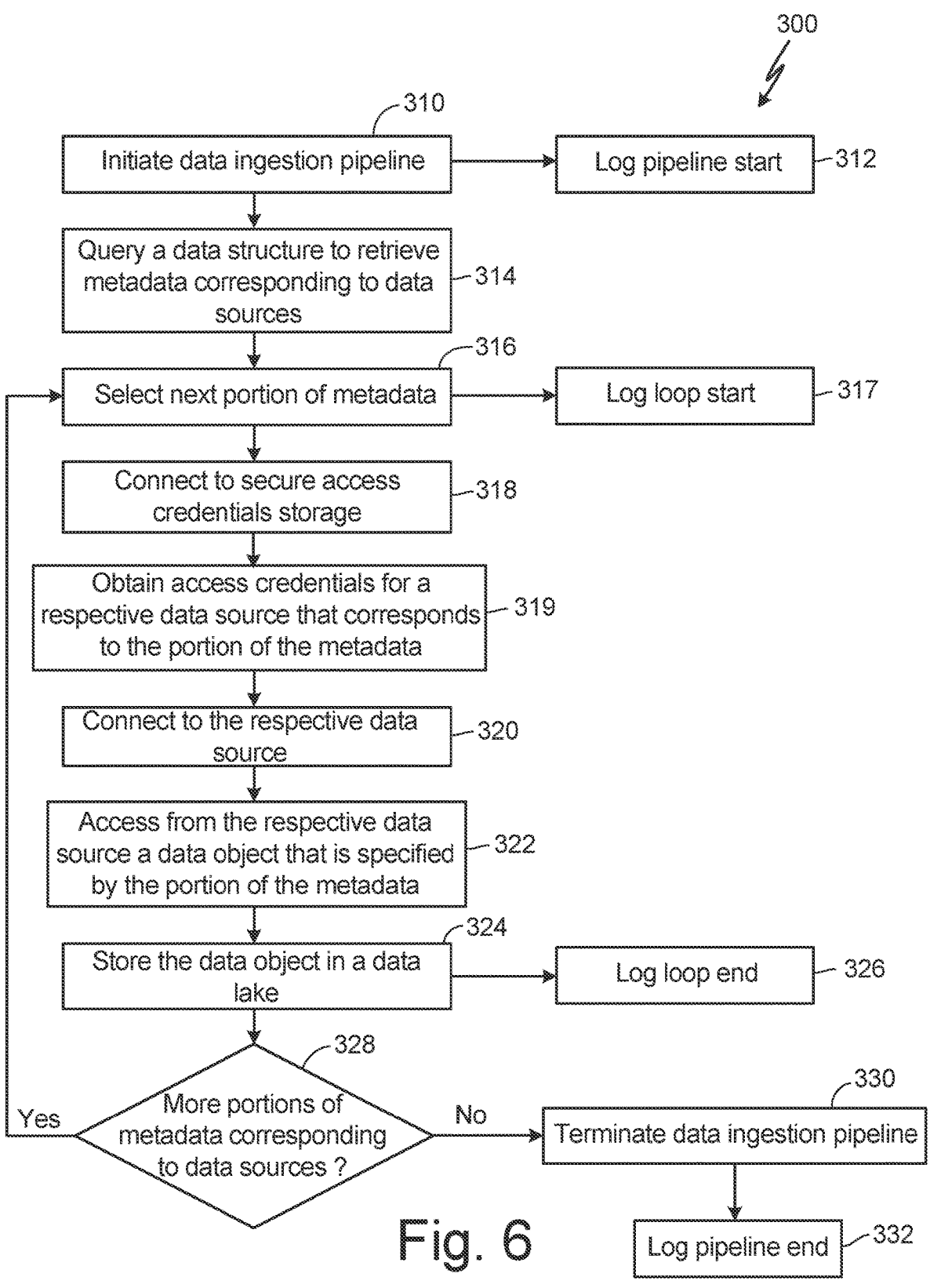

300

310 Initiate data ingestion pipeline → Log pipeline start 312

Query a data structure to retrieve metadata corresponding to data sources 314

316 Select next portion of metadata → Log loop start 317

Connect to secure access credentials storage 318

Obtain access credentials for a respective data source that corresponds to the portion of the metadata 319

Connect to the respective data source 320

Access from the respective data source a data object that is specified by the portion of the metadata 322

324 Store the data object in a data lake → Log loop end 326

328 More portions of metadata corresponding to data sources ?

Yes

No → Terminate data ingestion pipeline 330

Log pipeline end 332

Fig. 6

SCALABLE METADATA-DRIVEN DATA INGESTION PIPELINE

BACKGROUND

The present disclosure relates generally to data aggregation, and more specifically to data ingestion pipelines.

Organizations use business intelligence (BI) technologies to generate actionable business insights and other analytics from large data sets (i.e., big data). Business data is often stored in various data sources, including on-premises data stores and cloud data stores. An organization may want to aggregate data from its various data sources in some way to provide, for example, a holistic view of the business or other insights.

To analyze its business data, an organization can aggregate the data in a centralized location, such as a cloud-based data lake, via a data ingestion pipeline. Two common data ingestion procedures that may be used for aggregating data are extract-transform-load (ETL) and extract-load-transform (ELT). In an ETL procedure, data is extracted from data sources, transformed using a series of rules or functions to prepare it for loading into an end target store, and loaded into the end target store. ELT is a variation of ETL. In an ELT procedure, data extracted from the data sources is loaded into the end target store before any transformation steps. Either ETL or ELT can be used for ingesting data, depending on the use case.

Organizations can build fully custom data movement components and systems or can utilize commercially available platforms, such as Microsoft Azure Data Factory or Amazon AWS Data Pipeline, to create custom workflows, i.e., pipelines, for moving and transforming data.

SUMMARY

In one example, a method of ingesting data into a data lake includes initiating, by a computer device, a data pipeline by performing a lookup activity that includes querying a data structure to retrieve metadata corresponding to data sources; and performing, by the computer device, a sequence of activities for each of the data sources. The metadata stored in the data structure includes information that enables identifying and connecting to each of the data sources. The sequence of activities performed for each of the data sources includes connecting to a respective one of the data sources using a portion of the metadata that corresponds to the respective one of the data sources to form a connection to the respective one of the data sources; accessing, from the respective one of the data sources via the connection, a data object specified by the portion of the metadata that corresponds to the respective one of the data sources; and storing the data object in the data lake, the data lake being remote from each of the data sources.

In another example, a method of forming a data pipeline template for ingesting data into a data lake includes organizing metadata corresponding to a plurality of data sources into a data structure, wherein the metadata includes information that enables identifying and connecting to each data source of the plurality of data sources; storing the data structure on a database such that the data structure is configured to be queried to retrieve the metadata; and generating an ordered sequence of activities to be performed by a computer device. The ordered sequence of activities includes first, initiating a data pipeline by performing a lookup activity that includes querying the data structure to retrieve metadata corresponding to one or more data sources of the plurality of data sources; and second, performing a subset sequence of activities for each of the one or more data sources. The subset sequence of activities includes connecting to a respective one of the one or more data sources using a portion of the metadata that corresponds to the respective one of the one or more data sources to form a connection to the respective one of the one or more data sources; accessing, from the respective one of the one or more data sources via the connection, a data object specified by the portion of the metadata that corresponds to the respective one of the one or more data sources; and storing the data object in the data lake, the data lake being remote from each of the data sources.

In another example, a data pipeline system for ingesting data into cloud storage includes one or more processors and computer-readable memory encoded with instructions that, when executed by the one or more processors, cause the data pipeline system to initiate a data pipeline by performing a lookup activity that includes querying a data structure to retrieve metadata corresponding to data sources; and perform a sequence of activities for each of the data sources. The metadata stored in the data structure includes information that enables identifying and connecting to each of the data sources. The sequence of activities performed for each of the data sources includes connecting to a respective one of the data sources using a portion of the metadata that corresponds to the respective one of the data sources to form a connection to the respective one of the data sources; accessing, from the respective one of the data sources via the connection, a data object specified by the portion of the metadata that corresponds to the respective one of the data sources; and storing the data object in the data lake, the data lake being remote from each of the data sources.

BRIEF DESCRIPTION OF THE DRAWINGS

FIG. 6 is a process flowchart illustrating steps of an embodiment of the process for ingesting data including steps for obtaining access credentials.

DETAILED DESCRIPTION

According to techniques of this disclosure, a data pipeline integrates data source metadata to ingest large amounts of data from various data sources into cloud-based data storage (e.g., a data lake) in a secure and scalable manner. One concern with data aggregation in the big data context is that moving large amounts of data into the cloud can be onerous.

Significantly, a typical approach to data ingestion involving individual data ingestion pipelines does not scale well. For example, if an organization has a variety of separate data stores where business data is stored that the organization wants to aggregate in the cloud for analytics, then the traditional approach might be to write a program (i.e., a data ingestion pipeline) for each data source to direct the data stored therein to the cloud data store. This rapidly becomes impractical if the organization has many (e.g., one hundred, five hundred, etc.) source data stores because an individual data ingestion pipeline would need to be written and maintained for each separate data source.

In contrast, the data ingestion pipeline described herein is metadata-driven because the process is based on abstracting away specifics due to common points that would be present in a number of separate pipelines for ingesting data from a set of data sources. For example, the common point for each pipeline when ingesting data from a set of data sources into one cloud-based data lake would be the shared destination (the data lake). Accordingly, the specifics of each data source can be abstracted away in the overall pipeline template. Information that enables identifying and connecting to each data source can be stored separately as metadata that corresponds to the data sources. The relevant metadata can be supplied to parameters in the pipeline to ingest data from specific data sources to the shared data lake. The data ingestion pipeline system disclosed herein and corresponding methods are described below with reference to FIGS. 1-8.

Figure 1:
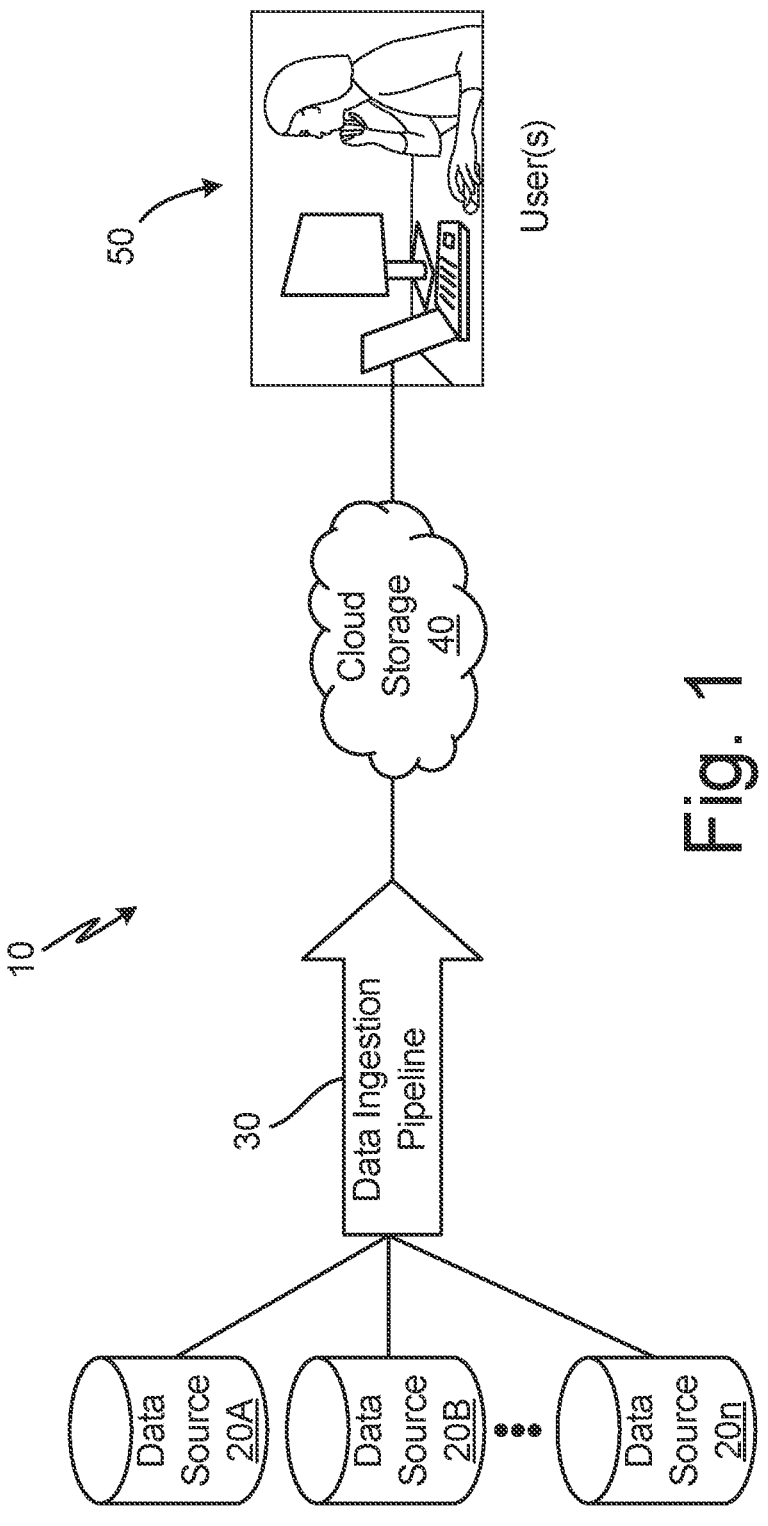
FIG. 1 is a simplified schematic diagram of a data pipeline system for ingesting data from various data sources into cloud storage.

FIG. 1 is a simplified schematic diagram of data pipeline system 10 for ingesting data from various data sources into cloud storage. Data pipeline system 10 includes data sources 20A-20n ("n" is used herein as an arbitrary integer to indicate any number of the referenced component), data ingestion pipeline 30, cloud storage 40, and user(s) 50. System 10 can, for example, be based in Azure Data Factory or any similar platform.

Data sources 20A-20n are stores or collections of electronic data. Data sources 20A-20n can be relational, non-relational, or other data storage types. In some examples, data sources 20A-20n can be databases, such as Oracle databases, Azure SQL databases, or any other type of database. In some examples, data sources 20A-20n can be data lakes. In other examples, data sources 20A-20n can be SharePoint lists or flat file types, such as Excel spreadsheets. In yet other examples, data sources 20A-20n can be any suitable store of electronic data. Each of data sources 20A-20n can be the same type of data source or can be different types of data sources. In some examples, there can be groups of data sources 20A-20n with the same data source type. Further, although three data sources 20A-20n are depicted in FIG. 1, it should be understood that data pipeline system 10 can include any number of data sources 20A-20n, including more or fewer data sources 20A-20n. System 10 can, in principle, include a large and scalable number of data sources 20A-20n.

Data located in data sources 20A-20n can be structured (e.g., rows and columns in a relational database), unstructured, or semi-structured. In some examples, data sources 20A-20n store business data, such as employee information, customer information, sales information, financial information, etc., for an organization. In other examples, data sources 20A-20n store any type of electronic data. Each of data sources 20A-20n can store a same or different type of data.

Data ingestion pipeline 30 is a logical organization or template for a computer device (e.g., including software and hardware) that encapsulates one or more activities for ingesting data from data sources 20A-20n. In other words, data ingestion pipeline 30 is a framework that defines an ordered sequence of activities for moving data from data sources 20A-20n to a destination data store (e.g., cloud storage 40). Pipeline 30 can, for example, represent steps associated with an extract-transform-load (ETL) procedure or, in other examples, an extract-load-transform (ELT) procedure. Individual activities of pipeline 30 may have dependencies on other activities or may be nested within other activities and may be executed in parallel or in series, depending on the configuration of pipeline 30. Activities of pipeline 30 may also define loops for iterating through some or all of the activities. In some examples, pipeline 30 represents an overarching pipeline framework that includes multiple iterations or versions of the same sequence of activities (i.e., multiple subset pipelines nested within pipeline 30). For example, pipeline 30 can include the same sequence of activities organized into multiple iterations or versions based on a data source type of data sources 20A-20n. That is, pipeline 30 can include a separate subset pipeline for each data source type of data sources 20A-20n. Pipeline 30 provides a means for managing all the activities together as a set instead of individually managing each activity. For example, pipeline 30 can be scheduled or deployed itself, rather than separately deploying each pipeline activity. Each individual instance of deploying data ingestion pipeline 30 can be the same or different depending on what data should be obtained from which ones of data sources 20A-20n.

Cloud storage 40 is a destination data store for data ingested from data sources 20A-20n via pipeline 30. Cloud storage 40 can be located remotely from data sources 20A-20n. Cloud storage 40 can be, for example, a data lake. In some examples, cloud storage 40 stores raw copies of source data from data sources 20A-20n. In some examples, cloud storage 40 can also store transformed data to be used for tasks such as reporting, visualization, analytics, machine learning, etc. One or more users 50, such as data engineers, data scientists, or any other users, can connect to cloud storage 40 to access and use data that is stored within cloud storage 40.

In general, each of data sources 20A-20n, components of data ingestion pipeline 30, cloud storage 40, and user(s) 50 can be remote from each other. Individual ones of data sources 20A-20n can also be remote from each other. For example, individual data sources 20A-20n can be "on-premises" data sources (e.g., within an organization's data centers) or "cloud" data sources (e.g., available using cloud services from vendors such as Amazon, Microsoft, or Google). Similarly, data ingestion pipeline 30 can be wholly or partially cloud-based. Wholly or partially cloud-based data ingestion pipeline 30 can be available from a same or different cloud service as one or more data sources 20A-20n in examples where the one or more data sources 20A-20n is also cloud-based. Cloud storage 40 can be available from a same or different cloud service as a wholly or partially cloud-based data ingestion pipeline 30. Cloud storage 40 can also be available from a same or different cloud service as one or more data sources 20A-20n in examples where the one or more of data sources 20A-20n is also cloud-based. Moreover, one or more activities of data ingestion pipeline 30 may not be executed in a fixed location, i.e., one or more activities of data ingestion pipeline 30 can be executed in different locations (e.g., on different processors).

Instead of requiring separate pipelines to be written and maintained for each individual data source from which data will be ingested, system 10 includes one overarching data ingestion pipeline or pipeline template (pipeline 30) that can accommodate connections to any number, including very large numbers, of data sources 20A-20n. Because data ingestion pipeline 30 can accommodate any number of data sources 20A-20n, system 10 is relatively easy to scale based on a particular organization's data ingestion needs. That is, regardless of the exact number of data sources 20A-20n an organization may have, the organization can apply pipeline 30 to connect to and ingest data from all of data sources 20A-20n, rather than writing separate pipelines for each of data sources 20A-20n. This scalability allows system 10 to accommodate larger or smaller data aggregation tasks, as needed. Moreover, system 10 is a simplified system for data aggregation compared to traditional approaches because it can greatly reduce the time needed from developers to establish and maintain connections to an organization's data sources. System 10, including pipeline 30, can also be relatively easier to monitor and maintain once it is deployed because system 10 is centralized, meaning that ingested data from data sources 20A-20n flows through the same pipeline 30, and information (about system status, performance, etc.) can all be obtained from one centralized place.

Figure 2:
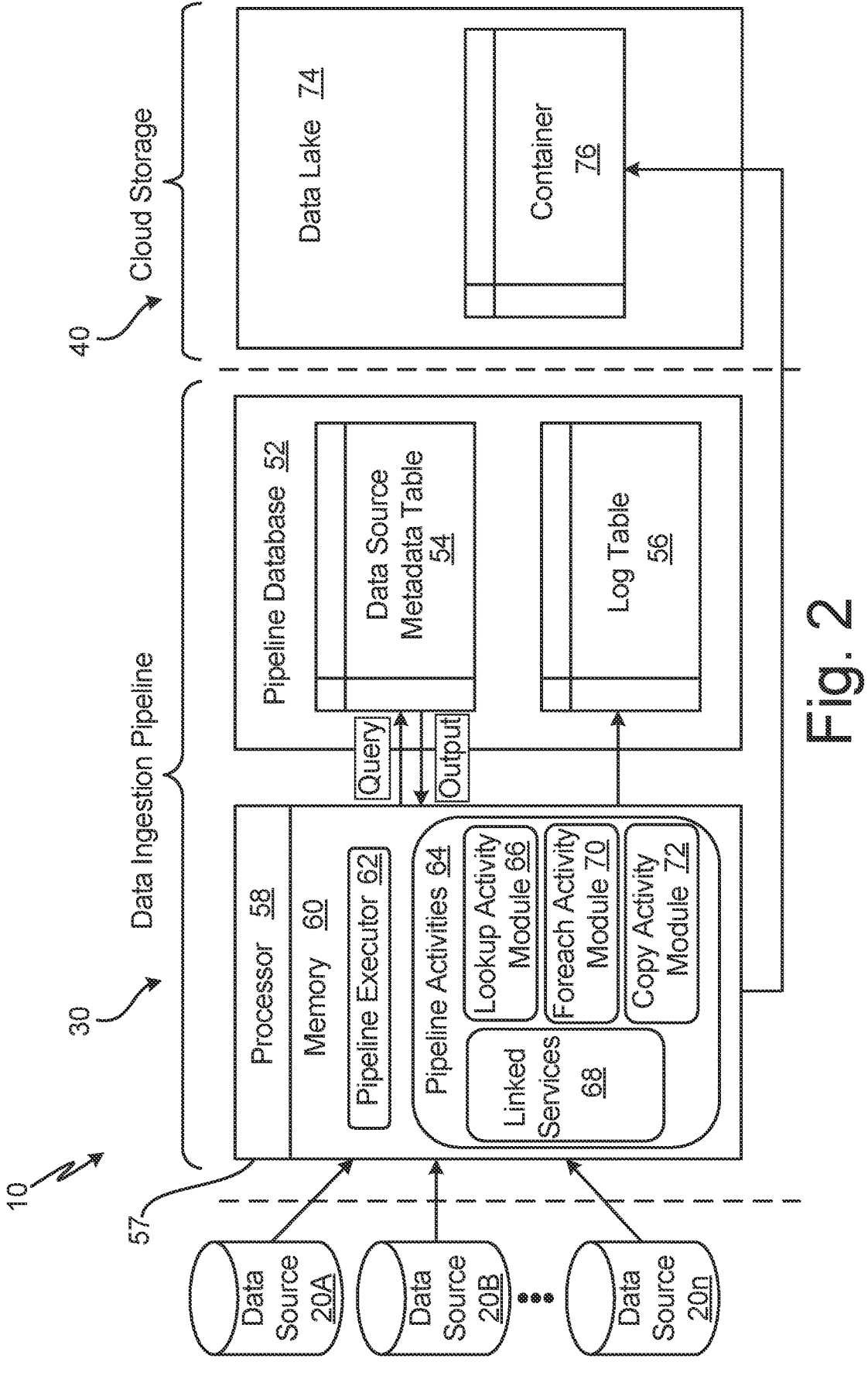
FIG. 2 is a schematic block diagram showing details of the data pipeline system.
Figure 3:
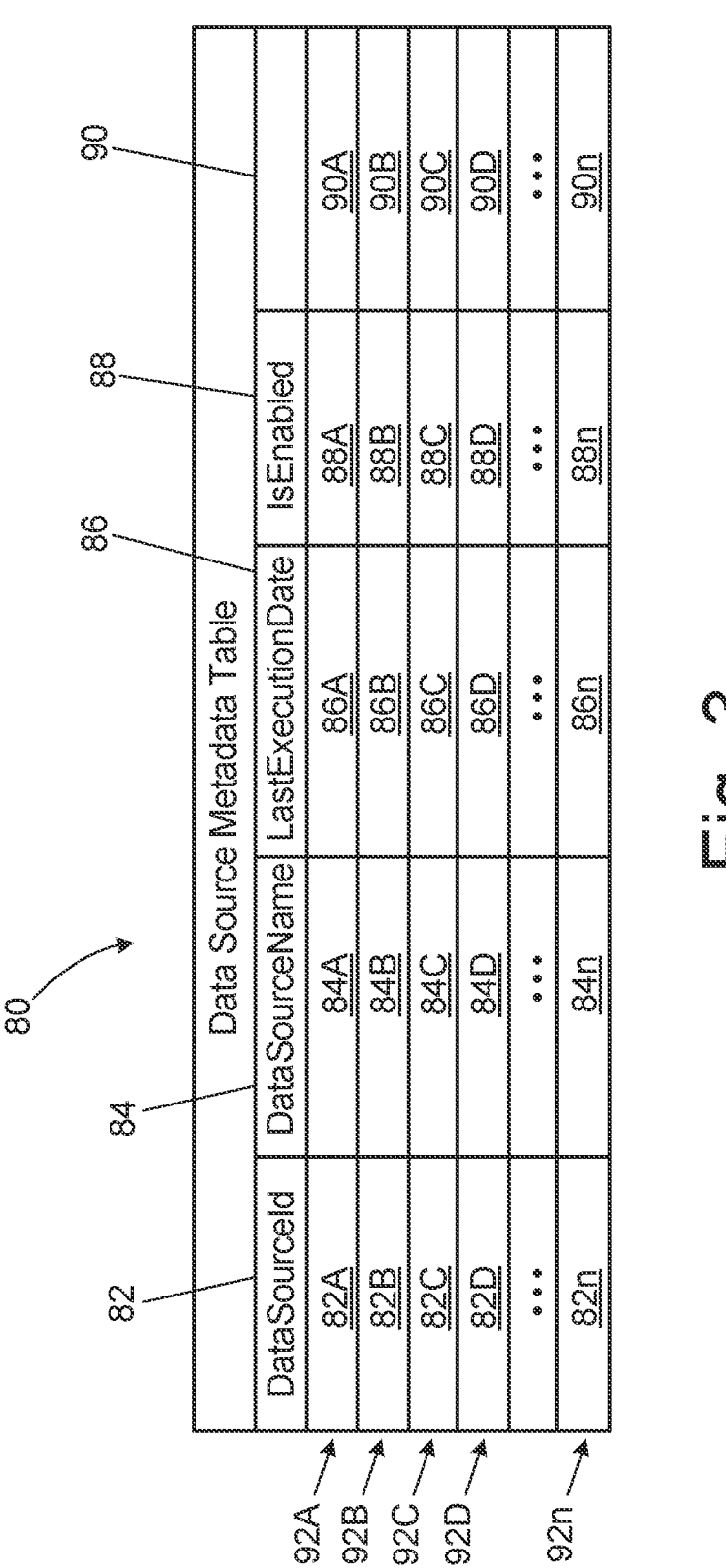
FIG. 3 is a simplified table of illustrative data source metadata.
Figure 4:
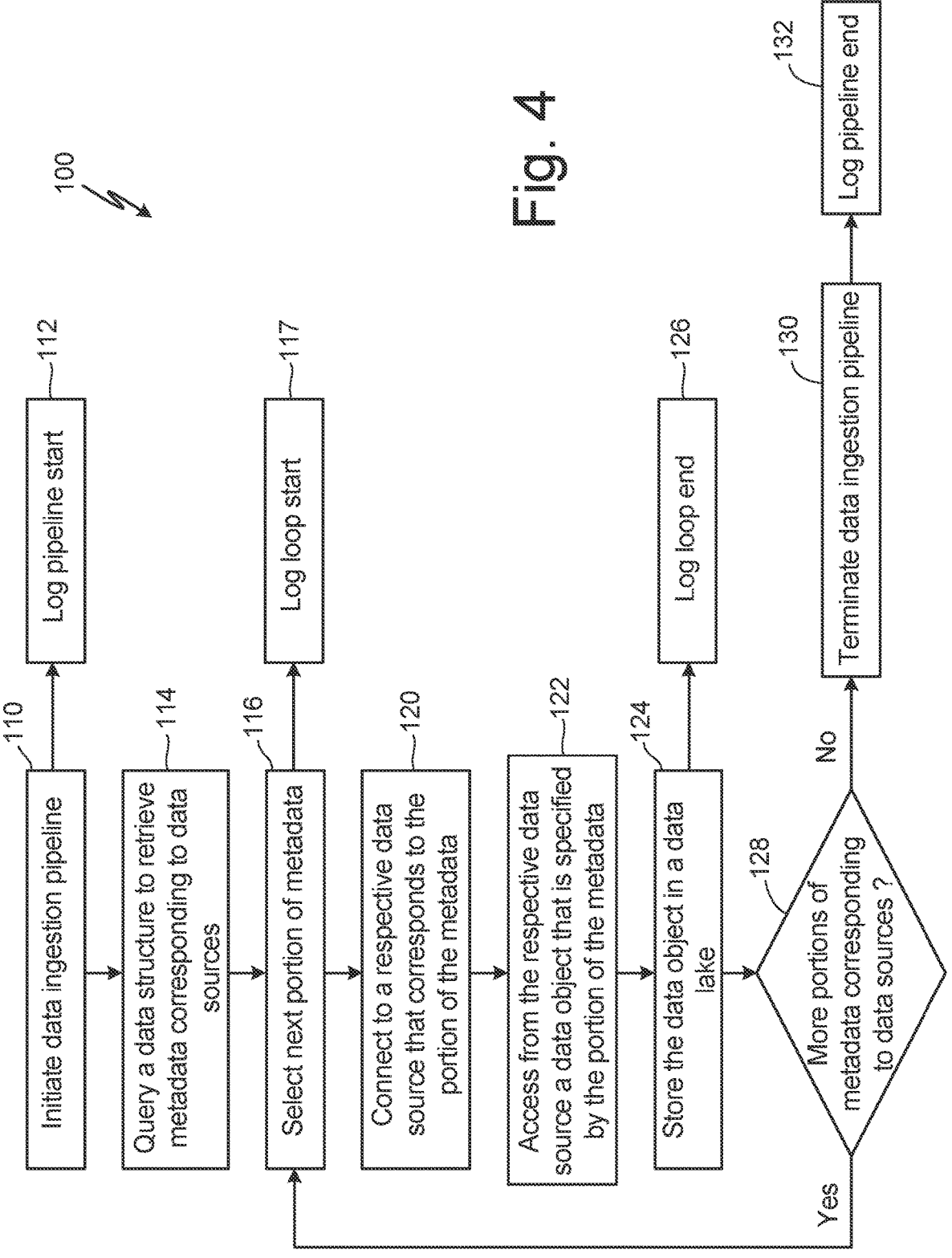
FIG. 4 is a process flowchart illustrating steps of a process for ingesting data from various data sources into cloud storage.

FIGS. 2-4 will be described together. FIG. 2 is a schematic block diagram showing details of data pipeline system 10. FIG. 3 is a simplified table of illustrative data source metadata. FIG. 4 is a process flowchart illustrating steps 110-132 of process 100 for ingesting data from various data sources into cloud storage.

Data pipeline system 10 includes data sources 20A-20n, data ingestion pipeline 30, and cloud storage 40, as described above with reference to FIG. 1. Data ingestion pipeline 30 further includes pipeline database 52 (including data source metadata table 54 and log table 56) and computer 57. Computer 57 includes processor 58, memory 60, pipeline executor 62, and pipeline activities module 64, which includes lookup activity module 66, linked services module 68, for each activity module 70, and copy activity module 72. Cloud storage 40 further includes data lake 74, which includes container 76.

Database 52 is a pipeline database for storing data source metadata table 54 and log table 56. In some examples, database 52 is a SQL database. In some examples, database 52 is a cloud-based Azure SQL database. Database 52 stores data source metadata table 54 such that metadata table 54 can be queried during a runtime of data ingestion pipeline 30 (i.e., an instance of executing data ingestion pipeline 30). Although metadata table 54 and log table 56 are shown in FIG. 2 as data structures that are stored on shared database 52, it should be understood that all or part of metadata table 54 and log table 56 can be stored on separate databases. For example, metadata table 54 can be stored on a first database (e.g., database 52) and log table 56 can be stored on a second database.

Metadata table 54 includes metadata that corresponds to each of data sources 20A-20n (i.e., a set of data that describes each of data sources 20A-20n and/or data objects stored therein). Metadata from data sources 20A-20n is entered into metadata table 54 prior to a runtime of data ingestion pipeline 30. Metadata table 54 is shown in FIG. 2 as a table but can also be a list or any data structure suitable for storing data in an organized manner. Metadata from each of data sources 20A-20n can be organized in metadata table 54 into clusters or portions (e.g., rows) according to the respective one of data sources 20A-20n to which the metadata corresponds.

Referring now to FIG. 3, metadata table 80 is an example of metadata table 54 (FIG. 2). Metadata table 80 includes columns 82, 84, 86, 88, and 90, which respectively include values 82A-82n, 84A-84n, 86A-86n, 88A-88n, and 90A-90n, organized in corresponding rows 92A-92n. Each column 82, 84, 86, 88, 90 corresponds to a shared attribute of the values in metadata table 80. Specifically, column 82 corresponds to the attribute "DataSourceId," which represents an identification or identity of each one of data sources 20A-20n. Column 84 corresponds to the attribute "DataSourceName," which represents a name of each one of data sources 20A-20n. Column 86 corresponds to the attribute "LastExecutionDate," which represents a date (and/or time) that each one of data sources 20A-20n was last executed. Column 88 corresponds to the attribute "IsEnabled," which represents an indication whether each one of data sources 20A-20n is enabled. Column 90 can correspond to any additional attribute, such as a data source type, a data object name, a last modified date, or other attribute. Moreover, although metadata table 80 is shown in FIG. 3 to include five columns, other examples can include more or fewer columns. More generally, metadata table 80 can include any suitable number of columns depending on the desired attributes to include to enable identifying and connecting to each of data sources 20A-20n. Taken together, the attributes represented by columns 82, 84, 86, 88, and 90 (and any additional columns of metadata table 80) can be information (i.e., metadata) about data sources 20A-20n that enables identifying and connecting to each one of data sources 20A-20n. Any of the columns, and particularly the attributes "LastExecutionDate" and "IsEnabled," can be periodically updated in metadata table 80 with information from data sources 20A-20n to ensure that the information (i.e., the values) contained in metadata table 80 is current.

Values in metadata table 80 can have different data types, e.g., varchar, date, int, bit, etc. Values contained within the same column (e.g., one of columns 82, 84, 86, 88, 90) can all have the same data type. For example, values 82A-82n in column 82 can all have the data type varchar, and values 88A-88n in column 88 can have a different data type, such as bit. Valid data types for the values in metadata table 80 can depend on a schema of the database (e.g., database 52) where metadata table 80 (or a different data structure containing metadata corresponding to data sources 20A-20n) is stored.

Each of rows 92A-92n corresponds to a respective one of data sources 20A-20n. Metadata table 80 can include any suitable number of rows 92A-92n. In some examples, a total number of rows in metadata table 80 can be equal to a total number of data sources 20A-20n. For example, row 92A is a relatively first row of metadata table 80, and row 92A can correspond to a first one of data sources 20A-20n (e.g., data source 20A). ("First" indicating that there are no rows of metadata table 80 before row 92A but not indicating any particular order of connecting to or retrieving information corresponding to data sources 20A-20n.) Row 92A includes values 82A, 84A, 86A, 88A, and 90A, which correspond, respectively, to each attribute (columns 82, 84, 86, 88, and 90) for the first one of data sources 20A-20n. Accordingly, value 82A is an identification of the first one of data sources 20A-20n, value 84A is a name of the first one of data sources 20A-20n, value 86A is a last execution date of the first one of data sources 20A-20n, and value 86A is an indication whether the first one of data sources 20A-20n is enabled. Values 82A, 84A, 86A, 88A, and 90A of row 92A, when taken together, can enable identifying and connecting to the first one of data sources 20A-20n.

Similarly, row 92B can correspond to a second one of data sources 20A-20$n$ (e.g., data source 20B). Row 92B includes values 82B, 84B, 86B, 88B, and 90B, which correspond, respectively, to each attribute (columns 82, 84, 86, 88, and 90) for the second one of data sources 20A-20$n$. Accordingly, value 82B is an identification of the second one of data sources 20A-20$n$, value 84B is a name of the second one of data sources 20A-20$n$, value 86B is a last execution date of the second one of data sources 20A-20$n$, and value 86B is an indication whether the second one of data sources 20A-20$n$ is enabled. Values 82B, 84B, 86B, 88B, and 90B of row 92B, when taken together, can enable identifying and connecting to the second one of data sources 20A-20$n$.

Row 92C can correspond to a third one of data sources 20A-20$n$ (e.g., data source 20C, not shown). Row 92C includes values 82C, 84C, 86C, 88C, and 90C, which correspond, respectively, to each attribute (columns 82, 84, 86, 88, and 90) for the third one of data sources 20A-20$n$. Accordingly, value 82C is an identification of the third one of data sources 20A-20$n$, value 84C is a name of the third one of data sources 20A-20$n$, value 86C is a last execution date of the third one of data sources 20A-20$n$, and value 86C is an indication whether the third one of data sources 20A-20$n$ is enabled. Values 82C, 84C, 86C, 88C, and 90C of row 92C, when taken together, can enable identifying and connecting to the third one of data sources 20A-20$n$.

Row 92D can correspond to a fourth one of data sources 20A-20$n$ (e.g., data source 20D, not shown). Row 92D includes values 82D, 84D, 86D, 88D, and 90D, which correspond, respectively, to each attribute (columns 82, 84, 86, 88, and 90) for the fourth one of data sources 20A-20$n$. Accordingly, value 82D is an identification of the fourth one of data sources 20A-20$n$, value 84D is a name of the fourth one of data sources 20A-20$n$, value 86D is a last execution date of the fourth one of data sources 20A-20$n$, and value 86D is an indication whether the fourth one of data sources 20A-20$n$ is enabled. Values 82D, 84D, 86D, 88D, and 90D of row 92D, when taken together, can enable identifying and connecting to the fourth one of data sources 20A-20$n$.

Row 92$n$ is a relatively last or final row of metadata table 80, and row 92$n$ can correspond to a relatively final one of data sources 20A-20$n$ (e.g., data source 20$n$). ("Last" or "final" indicating that there are no additional rows of metadata table 80 after row 92$n$ but not indicating any particular order of connecting to or retrieving information corresponding to data sources 20A-20$n$.) Row 92$n$ includes values 82$n$, 84$n$, 86$n$, 88$n$, and 90$n$, which correspond, respectively, to each attribute (columns 82, 84, 86, 88, and 90) for the final one of data sources 20A-20$n$. Accordingly, value 82$n$ is an identification of the final one of data sources 20A-20$n$, value 84$n$ is a name of the final one of data sources 20A-20$n$, value 86$n$ is a last execution date of the final one of data sources 20A-20$n$, and value 86$n$ is an indication whether the final one of data sources 20A-20$n$ is enabled. Values 82$n$, 84$n$, 86$n$, 88$n$, and 90$n$ of row 92$n$, when taken together, can enable identifying and connecting to the final one of data sources 20A-20$n$.

Referring again to FIG. 2, computer 57 includes processor 58 and memory 60. Although processor 58 and memory 60 are illustrated in FIG. 2 as being separate components of a single computer device, it should be understood that in other examples, processor 58 and memory 60 can be distributed among multiple connected devices. In yet other examples, memory 60 can be a component of processor 58. Processor 58 is configured to implement functionality and/or process instructions within data pipeline system 10. For example, processor 58 can be capable of processing instructions stored in memory 60. Examples of processor 58 can include one or more of a processor, a microprocessor, a controller, a digital signal processor (DSP), an application specific integrated circuit (ASIC), a field-programmable gate array (FPGA), or other equivalent discrete or integrated logic circuitry.

Memory 60 can be configured to store information before, during, and/or after operation of data pipeline system 10. Memory 60, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 60 can be entirely or partly temporary memory, meaning that a primary purpose of memory 60 is not long-term storage. Memory 60, in some examples, is described as volatile memory, meaning that memory 60 does not maintain stored contents when power to devices (e.g., computer 57) is turned off. Examples of volatile memories can include random access memories (RAM), dynamic random access memories (DRAM), static random access memories (SRAM), and other forms of volatile memories. Memory 60, in some examples, also includes one or more computer-readable storage media. Memory 60 can be configured to store larger amounts of information than volatile memory. Memory 60 can further be configured for long-term storage of information. In some examples, memory 60 includes non-volatile storage elements. Examples of such non-volatile storage elements can include magnetic hard discs, optical discs, flash memories, or forms of electrically programmable memories (EPROM) or electrically erasable and programmable (EEPROM) memories.

Memory 60 is encoded with instructions that are executed by processor 58. For example, memory 60 can be used to store program instructions for execution by pipeline executor 62 on processor 58. In some examples, memory 60 is used by software or applications running on processor 58, e.g., pipeline executor 62, to temporarily store information during program execution.

Pipeline executor 62 is a compute infrastructure or environment where individual activities of pipeline activities module 64 (e.g., lookup activity module 66, linked services module 68, for each activity module 70, and copy activity module 72) are executed directly or dispatched for execution. Pipeline executor 62 can also interact with other software, such as other programs or applications within the Microsoft Azure platform. Pipeline executor 62 can be a program that runs on processor 58 itself. In such examples, pipeline executor 62 can be either self-hosted (i.e., by an organization using an on-premises machine or virtual machine inside a private network) or hosted on a cloud-based platform, such as within Azure Data Factory. In other examples, pipeline executor 62 can dispatch one or more of the individual activities of pipeline activities module 64 to be run in a different location (i.e., on a different processor). In some examples, activities can be dispatched to compute environments that are local to ones of data sources 20A-20$n$ when a connection will be made to that respective one of data sources 20A-20$n$ during a runtime of data ingestion pipeline 30.

Pipeline activities module 64 is an ordered sequence of activities that makes up the functionality of data ingestion pipeline 30. Lookup activity module 66, linked services module 68, for each activity module 70, and copy activity module 72 are functional units or activity sub-modules (collectively, the "activity sub-modules") of pipeline activities module 64 within data ingestion pipeline 30. The activity sub-modules can correspond to distinct devices within data ingestion pipeline 30 or can be functional modules not corresponding to specific separate hardware. That is, although pipeline activities module 64 and each of lookup activity module 66, linked services module 68, for each activity module 70, and copy activity module 72 are illustrated as distinct functional modules executed within shared hardware, e.g., by processor 58 or on other shared hardware, any or all of the activity sub-modules can correspond to separate external logic-capable devices that include internal memory. For example, copy activity module 72 would not be executed by processor 58 when copy activity module 72 is dispatched by pipeline executor 62 to a compute environment that is local to one of data sources 20A-20n. In the most general case, however, each of pipeline activities module 64 and the activity sub-modules can be any logic level modules communicatively coupled to pipeline executor 62 on processor 58 and coupled to each other only or primarily via pipeline executor 62.

At a runtime of data ingestion pipeline 30, pipeline executor 62 executes the activity sub-modules of pipeline activities module 64 according to a configuration (e.g., a JSON file or files) retrieved, for example, from memory 60. The configuration defines the sequence or order—and any dependencies, loops, or specifications—of the activity sub-modules within pipeline activities module 64. In some examples, the configuration of pipeline activities module 64 can include multiple defined sequences of the activity sub-modules arranged into subset pipelines within pipeline 30. In some examples, there can be a defined sequence of the activity sub-modules that corresponds to each data source type (e.g., Oracle database, Azure SQL database, Azure Blob storage, etc.) of data sources 20A-20n (i.e., there can be a separate subset pipeline for each data source type). Each of the activity sub-modules can be represented in a portion of the configuration as a block of JSON that contains its respective properties. The configuration (JSON) file is parsed by pipeline executor 62 to perform an activity corresponding to one of the activity sub-modules. In some examples, the activity sub-modules can be organized into the configuration by accessing, arranging, and modifying template JSON blocks from a library of pre-defined pipeline activities. In other examples, pipeline executor 62 can include a program or script that performs the activities associated with each of the activity sub-modules in the defined order (rather than relying on a configuration file).

Pipeline activities module 64 can also be configured so that pipeline executor 62 logs and/or reports errors and statuses (or session information) associated with the activity sub-modules during a runtime of pipeline 30. For example, logs can be generated for a start and end of pipeline 30, a start and end of any loop iterations, or other points of pipeline 30. In some examples, logs can be generated that are specific to the activity performed for a given one of the activity sub-modules (e.g., a copy activity can generate a log of column names that were copied). Any logs generated during a runtime of pipeline 30 can be stored in log table 56. Log table 56 can be queried to return performance information about each step of pipeline 30 or about pipeline 30 overall. For example, performance information that might be determined from the logs in log table 56 can include how long it took to run pipeline 30 overall, how long it took to perform each iteration of a loop, etc. In some examples, pipeline executor 62 can also generate or trigger notifications associated with errors or statuses, such as a start or end, of the activity sub-modules or pipeline 30. For example, pipeline executor 62 can generate or trigger an email to be sent when a runtime of pipeline 30 is completed. In some examples, pipeline executor 62 can be integrated with another application for sending emails, such as an Azure Logic App.

A pipeline run or an instance of pipeline execution for pipeline 30 (or of a nested subset pipeline within pipeline 30) can be initiated via pipeline executor 62 by passing arguments (values) to parameters or placeholders that are defined in pipeline 30. Arguments can be passed manually or by defining pipeline triggers. Pipeline triggers can include scheduling pipeline 30 or activities (e.g., activities corresponding to lookup activity module 66, linked services module 68, for each activity module 70, and/or copy activity module 72) of pipeline 30 to be performed automatically after a defined period elapses or after a trigger event occurs. Trigger events can include, for example, updates to a dataset, such as an update to the data stored in one of data sources 20A-20n. In some examples, arguments passed to initiate pipeline 30 can also be passed to a particular activity sub-module or a pipeline trigger can be linked to a particular activity sub-module.

Lookup activity module 66 is a first functional unit of pipeline activities module 64. Lookup activity module 66 can receive an argument indicating a dataset or a part of a dataset to return. Lookup activity module 66 is configured to read and return the content of the indicated dataset, such as a configuration file, table, or other data structure (e.g., metadata table 54, 80), from the indicated data store (e.g., database 52). Lookup activity module 66 can return the result of a query or a stored procedure. In one example, lookup activity module 66 queries metadata table 80 to retrieve metadata corresponding to one or more of data sources 20A-20n.

The argument passed to lookup activity module 66 and the query of metadata table 80 can specify which rows 92A-92n (i.e., which data sources 20A-20n) and/or which columns 82, 84, 86, 88, 90 (i.e., which attributes) of metadata table 80 to retrieve values from. In some examples, lookup activity module 66 can retrieve the entire set of values (all rows and all columns) from metadata table 80 so that an entire set of metadata corresponding to all of data sources 20A-20n is retrieved. In other examples, lookup activity module 66 can retrieve only portions of the metadata that correspond to respective ones or more of data sources 20A-20n (one or more rows) or certain attributes (one or more columns). For example, lookup activity module 66 can retrieve a portion of the metadata that corresponds to ones of data sources 20A-20n that have the same data source type. In some examples, lookup activity module 66 can retrieve a portion of the metadata that corresponds to a respective one of data sources 20A-20n (one row).

Depending on a number or selection of rows to be returned (e.g., from metadata table 80), lookup activity module 66 can have multiple instances within pipeline 30. In some examples, the multiple instances of lookup activity module 66 can be run in parallel such that lookup activity module 66 can essentially split off and start two or more nearly identical instances of the subsequent activity sub-modules of pipeline 30 (i.e., nested subset pipelines within pipeline 30). In other examples, pipeline 30 can be configured (e.g., via the configuration corresponding to pipeline activities module 64 and retrieved by pipeline executor 62) to loop over the lookup activity until the desired number of rows is retrieved.

An output of lookup activity module 66 can be, for example, a single value corresponding to a particular row and column combination (one attribute of one data source 20A-20n), a set of values corresponding to a particular one of data sources 20A-20n, or an array of values corresponding to multiple data sources 20A-20n and multiple attributes. For example, the array of values can correspond to a group of data sources 20A-20n that have the same data source type. The output of lookup activity module 66 can be in a list format that maintains the row and column information corresponding to metadata table 80. Accordingly, the output list includes portions of metadata from metadata table 80 that correspond to respective ones or more of data sources 20A-20n. Further, the output of lookup activity module 66 can be consumed, or operated on, in a subsequent activity sub-module of pipeline activities module 64 within pipeline 30.

For each activity module 70 is a second functional unit of pipeline activities module 64. For each activity module 70 defines a loop of repeating actions within pipeline 30. That is, for each activity module 70 organizes subsequent activity sub-modules to be executed in a loop. For each activity module 70 can be considered an overarching activity sub-module with further nested ones of the activity sub-modules. In general, for each activity module 70 is used to iterate over a dataset. Iterations within for each activity module 70 can be performed concurrently (in parallel) or in series, depending on constraints of system 10 (e.g., hardware constraints, which may be accounted for in the configuration of pipeline activities module 64).

For each activity module 70 depends on lookup activity module 66, and, therefore, lookup activity module 66 is configured to precede for each activity module 70. The output from lookup activity module 66 makes up a dataset over which for each activity module 70 will iterate or operate on. For example, for each activity module 70 can receive the output list from lookup activity module 66 that includes portions (e.g., rows) of metadata from metadata table 80 corresponding to respective ones or more of data sources 20A-20n.

Each iteration within for each activity module 70 can correspond to a row in the output list from lookup activity module 66, and, therefore, can correspond to one of rows 92A-92n of metadata table 80 and a corresponding one of data sources 20A-20n. At a start of each iteration, for each activity module 70 can identify or move to a next row in the output list. Subsequent activity sub-modules can be linked to, or associated with, for each activity module 70 identifying or moving to a row in the output list. During a first iteration of for each activity module 70, for each activity module 70 can identify or move to a first row in the output list, which can correspond to a first one of data sources 20A-20n. For example, the first row in the output list can correspond to row 92A of metadata table 80 and data source 20A. After for each activity module 70 identifies the first row in the output list, a subsequent activity sub-module (e.g., copy activity module 72) can be deployed for the first row. For each activity module 70 then identifies or moves to the next row in the output list, which can correspond to a second one of data sources 20A-20n. For example, the second row in the output list can correspond to row 92B of metadata table 80 and data source 20B. After for each activity module 70 identifies the second row in the output list, the subsequent activity sub-module (e.g., copy activity module 72) can be deployed for the second row. The iteration process is repeated until there are no remaining rows in the output list. For each activity module 70 can have any number of iterations depending on the number of rows in the output list from lookup activity module 66.

Copy activity module 72 is a third functional unit of pipeline activities module 64. Copy activity module 72 is also a nested functional unit within for each activity module 70. An instance of copy activity module 72 is deployed for each iteration caused by for each activity module 70. In general, copy activity module 72 reads data from a data source (e.g., one of data sources 20A-20n) and writes the data to a destination or sink data store (e.g., data lake 74). For each iteration of for each activity module 70, copy activity module 72 establishes a connection to the respective one of data sources 20A-20n that corresponds to the row or portion of the dataset (e.g., the output list from lookup activity module 66) that is selected by for each activity module 70. For example, when for each activity module 70 goes to the first row in the output list, which can correspond to row 92A of metadata table 80 and data source 20A, copy activity module 66 can receive values 82A, 84A, 86A, 88A, and 90A from row 92A to identify and connect to corresponding data source 20A. This process is repeated for each instance of copy activity module 72 that is triggered by an iteration within for each activity module 70, such that the instances of copy activity module 72 collectively identify and connect to each of the one or more data sources 20A-20n that correspond to the portions of the metadata in the output list from lookup activity module 66. As will be described in greater detail below, the connection to the respective one of data sources 20A-20n and to data lake 74 can be made via linked services module 68.

A given instance of copy activity module 72 accesses and reads a data object from the respective one of data sources 20A-20n. The data object to be read by copy activity module 72 can be specified by the portion of the metadata from metadata table 80 that corresponds to the respective one of data sources 20A-20n. That is, one or more of the values received by copy activity module 72 from the row in the output list can specify the data object within the respective one of data sources 20A-20n. In some examples, the one or more of the values received by copy activity module 72 from the row in the output list can specify multiple data objects to access and read within the respective one of data sources 20A-20n.

Once the data object has been accessed, copy activity module 72 reads the data object and writes (i.e., copies) the data object to data lake 74, or any suitable destination data store that is specified in the properties of copy activity module 72, to store the data object in data lake 74. In some examples, storing the data object in data lake 74 can involve creating a copy of the data object from the respective one of data sources 20A-20n and storing the copy of the data object in data lake 74. In some examples, copy activity module 72 can be configured to incrementally copy new, updated, or modified/changed portions of data from data sources 20A-20n. In such examples, metadata table 80 can include a column corresponding to a watermark value, an incrementing key, or a last modified date, such that copy activity module 72 receives the watermark value corresponding to the respective one of data sources 20A-20n. Copy activity module 72 can also be configured to retrieve an old watermark value for the respective one of data sources 20A-20n, e.g., stored from a previous instance of pipeline 30. If there is a change in the watermark value for the respective one of data sources 20A-20n, copy activity module 72 can load the data between the two watermark values as the data object to store in data lake 74. Similarly, copy activity module 72 can include a filter property to only load a data object from the respective one of data sources 20A-20*n* if the watermark value is more recent than a time a data object was last copied from that data source to data lake 74.

Additionally, copy activity module 72 can perform serialization/deserialization, compression/decompression, column mapping, etc. between reading the data object from the respective one of data sources 20A-20*n* and storing the data object in data lake 74. These additional processing steps can be used to convert the data object from the data source to a specific format for storage in data lake 74. In some examples, data objects are stored in data lake 74 in a Parquet format. In other examples, copy activity module 72 can copy the data object "as is" without performing any additional processing steps. Moreover, copy activity module 72 can map a data object from the respective one of data sources 20A-20*n* to its corresponding location data lake 74 based on the attributes or columns (e.g., columns 82, 84, 86, 88, 90) of metadata table 80.

Linked services module 68 is a fourth functional unit of pipeline activities module 64. Instances of linked services module 68 are deployed within pipeline 30 to make connections between components, such as data stores and/or computes, of system 10. The properties associated with each instance of linked services module 68 (e.g., as specified in the JSON configuration file) can define the connection information needed to connect between two components at a runtime of pipeline 30. Each instance of linked services module 68 is formatted for a particular data source type. For data stores, a connection via linked services module 68 can be based on standard properties of different data store types. Within pipeline 30, there can be separate instances of linked services module 68 that correspond to a connection between each one of data sources 20A-20*n* (of a particular data source type) and data lake 74 and to a connection to database 52.

Linked services module 68 can be parameterized or can have defined (i.e., pre-configured or hard-written) connections. A connection string of linked services module 68 can be parameterized based on the metadata from metadata table 80 (e.g., based on the output list from lookup activity module 66). More specifically, to form a connection to a respective one of data sources 20A-20*n*, or between a respective one of data sources 20A-20*n* and data lake 74, an instance of linked services module 68 can be parameterized based on the portion of the metadata that corresponds to the respective one of data sources 20A-20*n*. That is, one or more of the values (e.g., values 82A-82*n*, 84A-84*n*, 86A-86*n*, 88A-88*n*, and 90A-90*n* of metadata table 80) corresponding to attributes of the respective one of data sources 20A-20*n* can be injected into the connection string. The value injected into the connection string can represent, e.g., the data source name or another attribute of the respective one of data sources 20A-20*n*. This instance of linked services module 68 can be associated with (or triggered by) a corresponding instance of copy activity module 72 for the respective one of data sources 20A-20*n*. On the other hand, known or set connections, such as to database 52 for retrieving metadata from metadata table 54, 80, can be defined or pre-configured in the properties of linked services module 68. For example, the configuration (JSON) file for the instance of linked services module 68 that forms the connection to database 52 can directly include the connection information needed to connect to database 52. The instance of linked services module 68 that forms the connection to database 52 can be associated with (or triggered by) lookup activity module 66. Similarly, linked services module 68 can also be pre-configured with the connection information needed to connect to data lake 74 (because data lake 74 is the common sink location for data ingested via pipeline 30).

Data lake 74 is a destination or sink data store associated with data ingestion pipeline 30 in system 10. Data lake 74 can be a cloud-based (i.e., remote) data lake. Data objects copied from the one or more data sources 20A-20*n* are stored in data lake 74. Data lake 74 can further include container 76. Container 76 can represent a grouping or data structure within data lake 74 for organizing and storing data objects copied from ones of data sources 20A-20*n*. The data objects can be stored in data lake 74 in any suitable format. In some examples, the data objects are stored in the Parquet format. Data objects that are stored in data lake 74 can be readily accessible, for example, for business analytics purposes or other purposes. Moreover, a file name of a respective data object in data lake 74 can be based on the portion of the metadata from metadata table 80 that corresponds to the respective one of data sources 20A-20*n* from which the data object was accessed. In some examples, the file name can include values corresponding to the data source identification (e.g., column 82, one of values 82A-82*n*), the data source name (e.g., column 84, one of values 84A-84*n*), and/or the data object name in the data source. More generally, the file name can be based on the values from any one or more of columns 82, 84, 86, 88, and 90 that correspond to the respective one of data sources 20A-20*n* from which the data object was accessed.

Process 100 for ingesting data from data sources 20A-20*n* into cloud storage 40, as illustrated in FIG. 4, will be described with reference to components of system 10 described above (FIGS. 1-3). Process 100 begins by initiating data ingestion pipeline 30 (step 110). As described above, pipeline 30 can be initiated manually or automatically based on a trigger. A start of data ingestion pipeline 30 is logged (step 112) when pipeline 30 is initiated, and this log can be stored in log table 56.

At step 114, metadata table 80 is queried, e.g., by lookup activity module 66, to retrieve metadata corresponding to one or more of data sources 20A-20*n*. An ordered sequence of activities to be performed for the one or more data sources 20A-20*n* can correspond to steps 116 to 126. At step 116, the next portion of the retrieved metadata is selected, e.g., by for each activity module 70. A portion of the metadata can be a row (e.g., rows 92A-92*n*) of metadata table 80 that corresponds to a respective one of data sources 20A-20*n*. During a first iteration or loop of process 100, the "next" portion of the metadata is a first portion or first row. A start of a first loop is logged once the respective portion of the metadata is selected (or before forming the connection to the respective one of data sources 20A-20*n*) (step 117). Subsequent iterations of the loop (starting at step 116) can be logged as second, third, etc. loop starts.

Within an iteration of the loop, a respective one of data sources 20A-20*n* that corresponds to the portion of the metadata is connected to, e.g., by linked services module 68 (step 120). At step 122, a data object that is specified by the portion of the metadata is accessed from the respective one of data sources 20A-20*n*. At step 124, the data object is stored in data lake 74. After the data object is stored in data lake 74, an end of the respective loop iteration (e.g., first, second, third, etc.) is logged (step 126). Both the loop start and the loop end logs can be stored in log table 56 for each iteration of the loop.

At step 128, a decision is made within for each activity module 70 to determine if there are more portions (e.g., more rows) of metadata remaining that correspond to additional ones of data sources 20A-20*n*. If there are more rows (Yes), the loop iterates again from step 116. If there are not more rows (No), the loop is completed and data ingestion pipeline 30 is terminated (step 130). An end of pipeline 30 can be logged (step 132) after the sequence of activities has been performed for each of the one or more data sources 20A-20n, and this log can also be stored in log table 56.

As described above, instead of requiring separate pipelines to be written and maintained for each individual data source from which data will be ingested, system 10 includes one overarching data ingestion pipeline or pipeline template (pipeline 30) that can accommodate connections to any number, including very large numbers, of data sources 20A-20n. Because data ingestion pipeline 30 can accommodate any number of data sources 20A-20n, system 10 is relatively easy to scale based on a particular organization's data ingestion needs. That is, regardless of the exact number of data sources 20A-20n an organization may have, the organization can apply pipeline 30 to connect to and ingest data from all of data sources 20A-20n, rather than writing separate pipelines for each of data sources 20A-20n. This scalability allows system 10 to accommodate larger or smaller data aggregation tasks, as needed.

System 10 is readily scalable because the information required to identify and connect to any one of data sources 20A-20n is contained centrally within metadata table 54, 80. Steps (e.g., the activities of lookup activity module 66, linked services module 68, for each activity module 70, and copy activity module 72) of pipeline 30 can all be configured based on metadata table 54, 80. That is, metadata table 54, 80 is a common point that ties all of the steps of pipeline 30 together because each of the activity sub-modules refers to metadata from metadata table 54, 80. Accordingly, the information that enables identifying and connecting to each of data sources 20A-20n can be consolidated in metadata table 54, 80 rather than spread out in the properties/configuration of each individual step of pipeline 30.

Moreover, system 10 is a simplified system for data aggregation compared to traditional approaches because it can greatly reduce the time needed from developers to establish and maintain connections to an organization's data sources. System 10 including pipeline 30 can also be relatively easier to monitor and maintain once it is deployed because system 10 is centralized in that ingested data from data sources 20A-20n flows through the same pipeline 30, so information, about system status, performance, etc. can all be obtained from one centralized place.

Additionally, updates to system 10 that may be made based on changes to data sources 20A-20n, such as adding new data sources, removing data sources, updating the data stored in data sources 20A-20n, etc. can be accomplished via metadata table 54, 80. The respective portions (e.g., row or rows) of metadata table 54, 80 can be modified to reflect changes to data sources 20A-20n, rather than requiring changes to be made to individual pipeline configurations that were written for each data source. Thus, metadata table 54, 80 enables pipeline 30 and system 10 to be more flexible.

Figure 5:
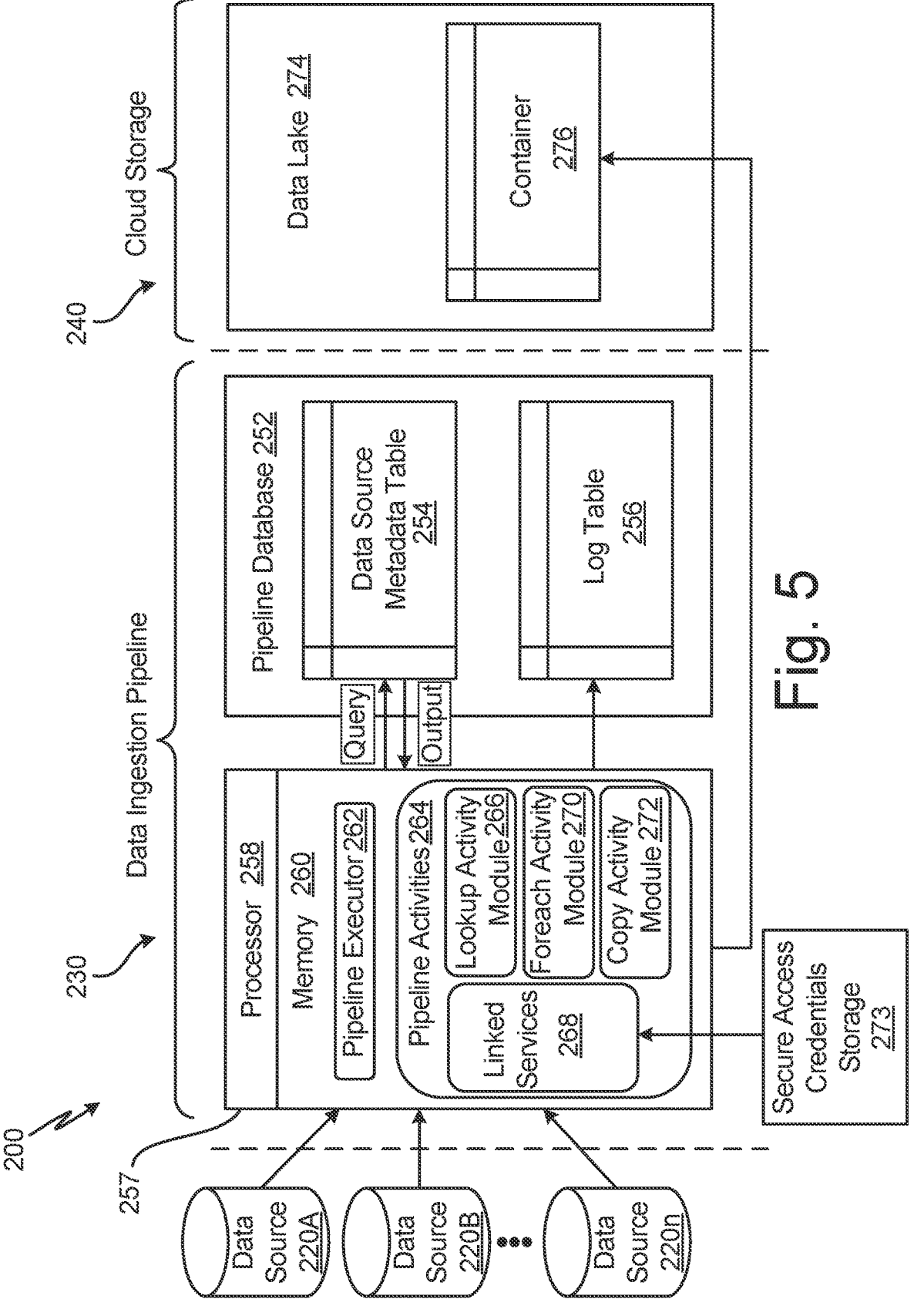
FIG. 5 is a schematic block diagram showing details of an embodiment of the data pipeline system that includes secure access credentials storage.

FIGS. 5 and 6 will be described together. FIG. 5 is a schematic block diagram showing details of data pipeline system 200 including secure access credentials storage 273. FIG. 6 is a process flowchart illustrating steps 310-332 of process 300 for ingesting data including steps for obtaining access credentials.

Data pipeline system 200 includes essentially the same components and function as described above with reference to data pipeline system 10 in FIGS. 2-4, except system 200 additionally includes secure access credentials storage 273. (Similar or identical components are given like designations with corresponding reference numbers that are increased by 200.) Secure access credentials storage 273 is a service, e.g., a software-as-a-service (SaaS), that securely stores and controls access to keys, passwords, certificates, or other any type of secure information. Secure access credentials storage 273 can be, for example, a cloud-based service such as Azure Key Vault. In system 200, secure access credentials storage 273 can securely store access credentials for data sources 220A-220n. Access credentials can include information such as a username and/or a password. The access credentials are tied to a key or secret associated with secure storage 273. Metadata table 254 can include a column, or attribute, corresponding to a name of the key or secret. To obtain the access credentials for connecting to a respective one of data sources 220A-220n, linked services module 268 can connect to secure access credentials storage 273 using the metadata value that specifies the name of the key or secret (i.e., a key value) for the respective one of data sources 220A-220n, the value having been retrieved as an output from lookup activity module 266 and passed to an iteration of copy activity module 272. Once the access credentials are obtained for the respective one of data sources 220A-220n, linked services module 268 can connect to the respective one of data sources 220A-220n using the access credentials.

Process 300 includes essentially the same steps as described above with reference to process 100 in FIG. 4, except process 300 additionally includes steps that correspond to secure access credentials storage 273. (Similar or identical steps are given like designations with corresponding reference numbers that are increased by 300.) Within an iteration of the loop (starting at step 316) and prior to connecting to one of data sources 220A-220n, linked services module 268 connects to secure access credentials storage 273 (step 318). At step 319, linked services module 268 obtains access credentials for the respective one of data sources 220A-220n that corresponds to the portion of the metadata selected by for each activity module 270 in this iteration of the loop. Once access credentials have been obtained, linked services module 268 can connect to the respective on of data sources 220A-220n (step 320). The remaining steps of process 300 proceed as described above with respect to process 100 (FIG. 4).

In addition to the benefits of system 10 described above, system 200 (and process 300) including secure access credentials storage 273 allows an additional level of security to be built into the pipeline. This is another example of the flexibility enabled by utilizing metadata table 254 in system 200 because the additional level of security is enabled by storing keys or secrets as attributes in metadata table 254.

Figure 7:
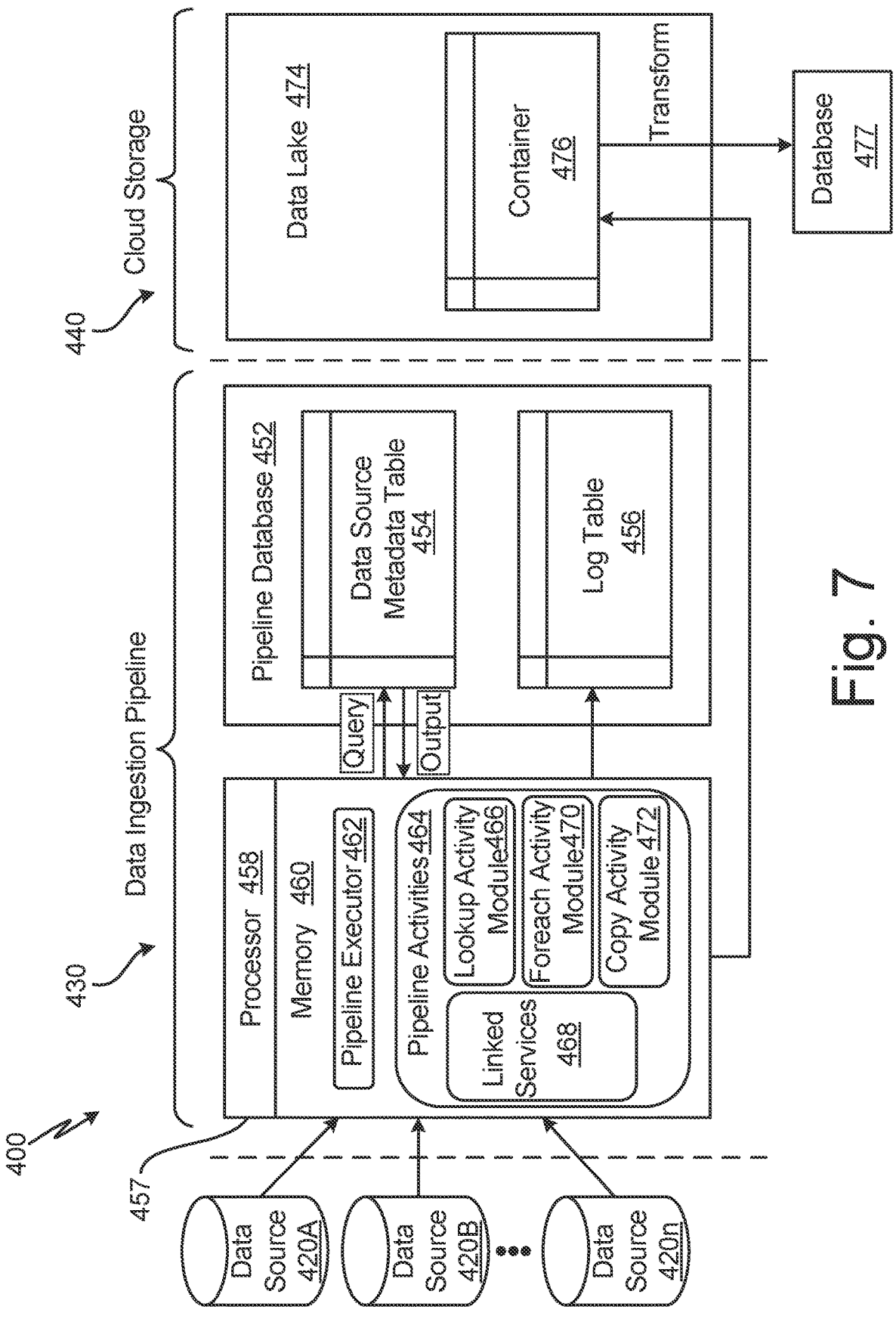
FIG. 7 is a schematic block diagram showing details of an embodiment of the data pipeline system that includes an additional database.
Figure 8:
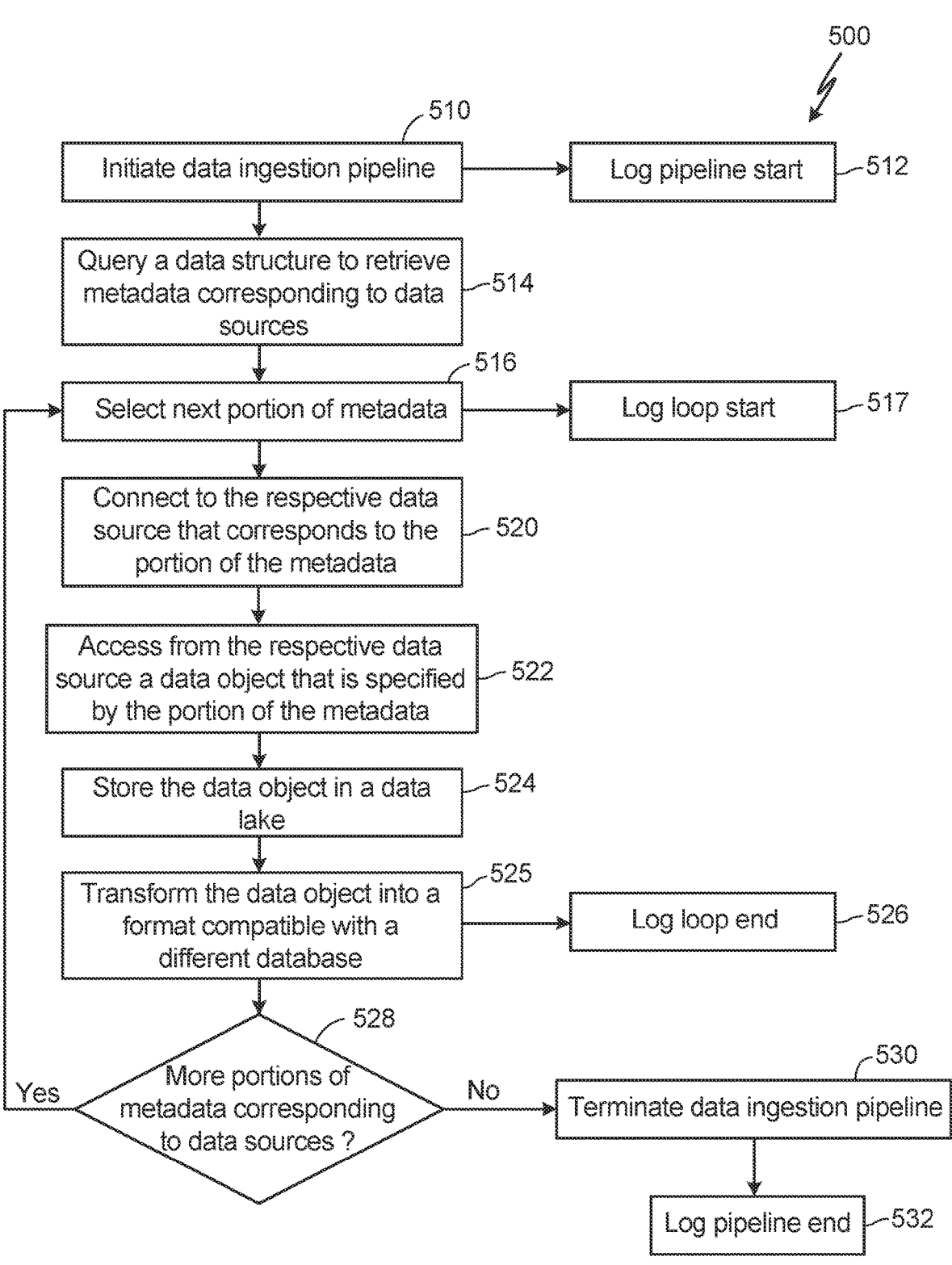
FIG. 8 is a process flowchart illustrating steps of an embodiment of the process for ingesting data including a step for transforming a data object.

FIGS. 7 and 8 will be described together. FIG. 7 is a schematic block diagram showing details of data pipeline system 400 including additional database 477. FIG. 8 is a process flowchart illustrating steps 510-532 of process 500 for ingesting data including a step for transforming a data object.

Data pipeline system 400 includes essentially the same components and function as described above with reference to data pipeline system 10 in FIG. 1, except system 400 additionally includes database 477. (Similar or identical components are given like designations with corresponding reference numbers that are increased by 400.) Database 477 is a data store that is different from data lake 474. Database 477 can include a database schema that allows users to use a query language against data stored therein. For example, database 477 can be an Apache Hive data warehouse associated with the Apache Hadoop ecosystem. In some examples, data objects stored in data lake 474 can be transformed, or processed, into a different format and stored, or copied, into database 477. The transformation or processing step can transform data from data lake 474 (e.g., stored in a Parquet format) into a format that is compatible with database 477. The transformation or processing step can retain metadata corresponding to the respective one of data sources 420A-420*n* that is associated with the respective data object. In some examples, the data objects stored in data lake 474 can be processed using Databricks within Microsoft Azure.

Process 500 includes essentially the same steps as described above with reference to process 100 in FIG. 4, except process 500 additionally includes a step that corresponds to the additional database 477. (Similar or identical steps are given like designations with corresponding reference numbers that are increased by 500.) Within an iteration of the loop (starting at step 516) and after the respective data object is stored in data lake 474, the data object can be transformed into a format that is compatible with a different database (e.g., database 477) (step 525). Thus, instead of logging an end of the loop after the data object is stored in data lake 474 (step 524), the end of the loop can be logged (step 526) after the transformation step 525. The remaining steps of process 500 proceed as described above with respect to process 100 (FIG. 4).

In addition to the benefits of system 10 described above, system 400 (and process 500) including database 477 enables data ingested from data sources 420A-420*n* to be transformed into a format that may be more accessible or user-friendly for analytics, visualization, etc. Thus, database 477 is an additional component that can be flexibly added once data has been ingested from data sources 420A-420*n* without requiring alteration of data ingestion pipeline 430. Database 477 can be a different cloud storage option that may be offered through a different service, so moving data from data lake 474 to a different database 477 can also be cost-efficient.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of ingesting data into a data lake, the method comprising:

consolidating pre-entered metadata enabling an identification of multiple data sources of multiple data pipelines, and a connection to each of the multiple data sources, into a common metadata table for an overarching data pipeline prior to initiating the overarching data pipeline, wherein the pre-entered metadata of the metadata table includes values associated with each of the multiple data sources that specify, for each of the multiple data sources, at least one of:

a data source identification;

a data source name;

whether a respective one of the multiple data sources is enabled; and a key value that is associated with access credentials for the respective one of the multiple data sources;

initiating, by a computer device, the overarching data pipeline by performing a lookup activity, the lookup activity including querying the metadata table that includes the pre-entered metadata, wherein the querying specifies a plurality of data sources from among the multiple data sources;

creating an overarching pipeline start log corresponding to a start of the overarching data pipeline when the overarching data pipeline is initiated;

retrieving, based on the querying, respective metadata from the metadata table that corresponds to the specified plurality of data sources of the multiple data sources; and performing, by the computer device, a sequence of activities for each data source of the specified plurality of data sources, the sequence of activities including:

creating a data source pipeline start log corresponding to a start of the sequence of activities for a respective one of the specified plurality of data sources before forming a connection to the respective one of the specified plurality of data sources;

connecting to the respective one of the specified plurality of data sources using a portion of the metadata from the metadata table that corresponds to the respective one of the specified plurality of data sources to form the connection to the respective one of the specified plurality of data sources by:

providing connection information to a linked services module based on the portion of the metadata from the metadata table that corresponds to the respective one of the specified plurality of data sources;

forming the connection to the respective one of the specified plurality of data sources via the linked services module;

connecting, via the linked services module, to a secure storage that contains the associated access credentials for the respective one of the specified plurality of data sources;

obtaining the access credentials for the respective one of the specified plurality of data sources from the secure storage by passing the key value to the secure storage via the linked services module; and using the access credentials for the respective one of the specified plurality of data sources in forming the connection to the respective one of the specified plurality of data sources via the linked services module;

accessing, from the respective one of the specified plurality of data sources via the connection, a data object specified by the portion of the metadata that corresponds to the respective one of the specified plurality of data sources; and storing the data object in the data lake, the data lake being remote from each of the multiple data sources;

creating a data source pipeline end log corresponding to an end of the sequence of activities for the respective one of the specified plurality of data sources when the data object is stored in the data lake; and creating an overarching data pipeline end log corresponding to an end of the overarching data pipeline after the sequence of activities has been performed for each of the specified plurality of data sources.

2. The method of claim 1, wherein initiating the overarching data pipeline further comprises initiating the overarching data pipeline manually by passing arguments to parameters of the overarching data pipeline at a runtime of the overarching data pipeline.

3. The method of claim 1, wherein initiating the overarching data pipeline further comprises initiating the overarching data pipeline by scheduling an instance of the overarching data pipeline to occur automatically after a defined period elapses or after an occurrence of a trigger event.

4. The method of claim 1, wherein connecting to the respective one of the specified plurality of data sources further comprises:

connecting to a secure storage that contains access credentials for the respective one of the specified plurality of data sources;

obtaining the access credentials for the respective one of the specified data sources from the secure storage; and using the access credentials for the respective one of the specified plurality of data sources in forming the connection to the respective one of the specified plurality of data sources.

5. The method of claim 1 and further comprising:

transforming the data object from the data lake into a different format such that the data object is compatible with a different database.

6. The method of claim 1, wherein the data structure is stored in an SQL database.

7. The method of claim 1, wherein the pre-entered metadata of the metadata table further includes values associated with each of the multiple data sources that specify, for each of the multiple data sources, at least one of:

a data object name; and a last execution date.

8. The method of claim 1, wherein storing the data object in the data lake further comprises incorporating values from the portion of the metadata that corresponds to the respective one of the specified plurality of data sources into a file name of the data object to enable identifying the data object in the data lake.

9. The method of claim 8, wherein the file name of the data object includes at least one of:

a data source name that corresponds to the respective one of the specified plurality of data sources; and a data object name that corresponds to the data object in the respective one of the specified plurality of data sources.

10. The method of claim 1, wherein storing the data object in the data lake further comprises storing the data object in a Parquet format.

11. The method of claim 10 and further comprising:

transforming the data object from the Parquet format into a different format such that the data object is compatible with a different database that is separate from the data lake.

12. The method of claim 1, wherein storing the data object in the data lake further comprises creating a copy of the data object from the respective one of the specified plurality of data sources and storing the copy of the data object in the data lake.

13. The method of claim 12, wherein storing the copy of the data object in the data lake further comprises writing the copy of the data object to a container within the data lake, the container being a destination for respective copies of data objects accessed from each of the specified plurality of data sources.

14. The method of claim 13, wherein writing the copy of the data object to the container within the data lake further comprises incorporating values from the portion of the metadata that corresponds to the respective one of the specified plurality of data sources into a file name of the copy of the data object to enable identifying the copy of the data object in the data lake.

15. The method of claim 1, wherein storing the data object in the data lake further comprises writing the data object to a container within the data lake, the container being a destination for respective data objects accessed from each of the specified plurality of data sources.

16. The method of claim 1 and further comprising:

storing the overarching data pipeline start log and the overarching data pipeline end log in a log table on a database.

17. The method of claim 16 and further comprising sending a notification corresponding to the end of the overarching data pipeline after the sequence of activities has been performed for each of the specified plurality of data sources, wherein the notification is an email.

18. The method of claim 1 and further comprising:

storing the data source pipeline start log and the data source pipeline end log for each of the specified plurality of data sources in a log table on a database.

19. The method of claim 1 and further comprising:

creating an error log and sending a notification if an error occurs while initiating the overarching data pipeline or while performing the sequence of activities, wherein the notification is an email; and storing the error log in a log table on a database.

20. The method of claim 1, wherein the data object comprises a new or updated portion of data stored in the respective one of the specified plurality of data sources.

21. The method of claim 20, wherein storing the data object in the data lake further comprises creating a copy of the new or updated portion of the data from the respective one of the specified plurality of data sources and storing the copy in the data lake.

22. The method of claim 21, wherein storing the copy in the data lake further comprises writing the copy to a container within the data lake, the container being a destination for respective copies of new or updated portions of data accessed from each of the specified plurality of data sources.

23. The method of claim 22, wherein writing the copy to the container within the data lake further comprises incorporating values from the portion of the metadata that corresponds to the respective one of the specified plurality of data sources into a file name of the copy to enable identifying the copy in the data lake.

24. A method of ingesting data into a data lake, the method comprising:

consolidating pre-entered metadata enabling an identification of multiple data sources of multiple data pipelines, and a connection to each of the multiple data sources, into a common metadata table for an overarching data pipeline prior to initiating the overarching data pipeline, wherein the pre-entered metadata of the metadata table includes values associated with each of the multiple data sources that specify, for each of the multiple data sources, at least one of:

a data source identification;

a data source name;

whether a respective one of the multiple data sources is enabled; and a key value that is associated with access credentials for the respective one of the multiple data sources;

initiating, by a computer device, the overarching data pipeline by performing a lookup activity, the lookup activity including querying the metadata table that includes the pre-entered metadata, wherein the querying specifies at least one attribute of a plurality of data sources of the multiple data sources;

creating an overarching pipeline start log corresponding to a start of the overarching data pipeline when the overarching data pipeline is initiated;

retrieving, based on the querying, respective metadata from the metadata table that corresponds to the specified plurality of data sources of the multiple data sources corresponding to the at least one attribute; and performing, by the computer device, a sequence of activities for each data source of the specified plurality of data sources, the sequence of activities including:

creating a data source pipeline start log corresponding to a start of the sequence of activities for a respective one of the specified plurality of data sources before forming a connection to the respective one of the specified plurality of data sources;

connecting to the respective one of the specified plurality of data sources using a portion of the metadata from the metadata table that corresponds to the respective one of the specified plurality of data sources to form the connection to the respective one of the specified plurality of data sources by:

providing connection information to a linked services module based on the portion of the metadata that corresponds to the respective one of the specified plurality of data sources;

forming the connection to the respective one of the specified plurality of data sources via the linked services module;

connecting, via the linked services module, to a secure storage that contains the associated access credentials for the respective one of the specified plurality of data sources;

obtaining the access credentials for the respective one of the specified plurality of data sources from the secure storage by passing the key value to the secure storage via the linked services module; and using the access credentials for the respective one of the specified plurality of data sources in forming the connection to the respective one of the specified plurality of data sources via the linked services module;

accessing, from the respective one of the specified plurality of data sources via the connection, a data object specified by the portion of the metadata that corresponds to the respective one of the specified plurality of data sources; and storing the data object in the data lake, the data lake being remote from each of the multiple data sources;

creating a data source pipeline end log corresponding to an end of the sequence of activities for the respective one of the specified plurality of data sources when the data object is stored in the data lake; and creating an overarching pipeline end log corresponding to an end of the overarching data pipeline after the sequence of activities has been performed for each of the specified plurality of data sources.

25. The method of claim 24 and further comprising:

configuring the overarching data pipeline to be initiated manually by passing arguments to parameters of the overarching data pipeline at a runtime of the overarching data pipeline; or configuring the overarching data pipeline to be initiated by scheduling an instance of the overarching data pipeline to occur automatically after a defined period elapses or after an occurrence of a trigger event.

26. The method of claim 24 and further comprising:

defining a first connection to a database that stores the metadata table via a linked services module; and defining a second connection to the data lake via the linked services module.

27. A data pipeline system for ingesting data into cloud storage, the system comprising:

one or more processors; and computer-readable memory encoded with instructions that, when executed by the one or more processors, cause the data pipeline system to:

consolidate pre-entered metadata enabling an identification of multiple data sources of multiple data pipelines, and a connection to each of the multiple data sources, into a common metadata table for an overarching data pipeline prior to initiating the overarching data pipeline, wherein the pre-entered metadata of the metadata table includes values associated with each of the multiple data sources that specify, for each of the multiple data sources, at least one of:

a data source identification;

a data source name;

whether a respective one of the multiple data sources is enabled; and a key value that is associated with access credentials for the respective one of the multiple data sources;

initiate the overarching data pipeline by performing a lookup activity, the lookup activity including querying the metadata table that includes the pre-entered metadata, wherein the querying specifies a plurality of data sources of the multiple data sources;

create an overarching pipeline start log corresponding to a start of the overarching data pipeline when the overarching data pipeline is initiated;

retrieve, based on the querying, metadata that corresponds to the specified plurality of data sources of the multiple data sources; and perform a sequence of activities for each data source of the specified data sources, the sequence of activities including:

creating a data source pipeline start log corresponding to a start of the sequence of activities for a respective one of the specified plurality of data sources before forming a connection to the respective one of the specified plurality of data sources;

connecting to the respective one of the specified plurality of data sources using a portion of the metadata from the metadata table that corresponds to the respective one of the specified plurality of data sources to form the connection to the respective one of the specified data sources by:

providing connection information to a linked services module based on the portion of the metadata that corresponds to the respective one of the specified data sources;

forming the connection to the respective one of the specified data sources via the linked services module;

connecting, via the linked services module, to a secure storage that contains the associated access credentials for the respective one of the specified plurality of data sources;

obtaining the access credentials for the respective one of the specified plurality of data sources from the secure storage by passing the key value to the secure storage via the linked services module; and using the access credentials for the respective one of the specified plurality of data sources in forming the connection to the respective one of the specified plurality of data sources via the linked services module;

accessing, from the respective one of the specified plurality of data sources via the connection, a data object specified by the portion of the metadata that corresponds to the respective one of the specified plurality of data sources; and storing the data object in the data lake, the data lake being remote from each of the multiple data sources;

creating a data source pipeline end log corresponding to an end of the sequence of activities for the respective one of the specified plurality of data sources when the data object is stored in the data lake; and create an overarching pipeline end log corresponding to an end of the overarching data pipeline after the sequence of activities has been performed for each of the specified plurality of data sources.

\* \* \* \* \*